(12) United States Patent
Sugiyama

(10) Patent No.: US 8,407,857 B2
(45) Date of Patent: Apr. 2, 2013

(54) CUSHION CLIP

(75) Inventor: Takahiro Sugiyama, Anjo (JP)

(73) Assignee: Daiwa Kasei Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/110,616

(22) Filed: May 18, 2011

(65) Prior Publication Data

US 2011/0283490 A1    Nov. 24, 2011

(30) Foreign Application Priority Data

May 21, 2010  (JP) .................................. 2010-117074

(51) Int. Cl.
    *E05F 5/00*    (2006.01)
(52) U.S. Cl. ........... 16/86 R; 24/458; 296/1.03; 267/141
(58) Field of Classification Search .............. 16/82, 85, 16/86 R, 86 A, 86 B, DIG. 21; 296/37.12, 296/1.03, 207; 24/457–458, 570, 591.1; 293/104, 132, 136; 267/136, 141
    See application file for complete search history.

(56) References Cited

U.S. PATENT DOCUMENTS

| 6,857,166 | B2 * | 2/2005 | Nakagaki et al. ............. 16/86 R |
| 7,566,081 | B2 * | 7/2009 | Aoyama ....................... 296/1.03 |
| 2010/0192335 | A1 * | 8/2010 | Ukai et al. ................... 24/591.1 |
| 2011/0030177 | A1 * | 2/2011 | Ukai et al. ...................... 24/458 |
| 2011/0167590 | A1 * | 7/2011 | Ukai et al. ......................... 16/85 |

FOREIGN PATENT DOCUMENTS

| JP | 2006097326 A | * | 4/2006 |
| JP | 2006153083 A | * | 6/2006 |
| JP | 2007225093 A | * | 9/2007 |
| JP | 2008094261 A | * | 4/2008 |
| JP | 2008111451 A | * | 5/2008 |
| JP | 2008-196651 |   | 8/2008 |
| JP | 2009222074 A | * | 10/2009 |
| JP | 2010001967 A | * | 1/2010 |
| JP | 201016417 A | * | 7/2010 |
| JP | 2010151179 A | * | 7/2010 |
| JP | 2011027209 A | * | 2/2011 |
| JP | 2011064292 A | * | 3/2011 |
| WO | WO 2010001994 A1 | * | 1/2010 |

* cited by examiner

*Primary Examiner* — William L. Miller
(74) *Attorney, Agent, or Firm* — Douglas J. Christensen

(57) ABSTRACT

A cushion clip may include a cushioning portion made of a soft material and capable of being elastically deformed when a compression force is applied thereto, an attachment portion made of a hard material, and a connecting portion integrally formed with the attachment portion. The connecting portion is embedded in the cushioning portion such that the cushioning portion can be integrated with the attachment portion. A portion of the cushioning portion surrounding an outer circumferential periphery of an end surface of the connecting portion has a lateral thickness that is varied in a direction in which the compression force is applied to the cushioning portion.

6 Claims, 5 Drawing Sheets

CUSHION CLIP

BACKGROUND OF THE INVENTION

1. Field of the Invention

The present invention relates to a cushion clip that is used in a vehicle. More particularly, the present invention relates to a cushion clip that is attached to a fixed member (e.g., a vehicle body) in order to receive a load of a movable member (e.g., a vehicle slide door) and to absorb impact caused thereby.

2. Description of Related Art

A known cushion clip of this type is taught by, for example, Japanese Laid-Open Patent Publication Number 2008-196651. The cushion clip has a cushioning portion made of a soft material such as a thermoplastic elastomer (TPE), an attachment portion made of a hard material such as polypropylene (PP), and a connecting portion integrally formed with the attachment portion. The connecting portion is embedded (received) in the cushioning portion such that the cushioning portion can be integrated with the attachment portion. The attachment portion is inserted into an attachment hole formed in a fixed member (e.g., a vehicle body), so that the cushion clip can be attached to the fixed member.

In the known cushion clip in which the attachment portion made of PP is integrated with the cushioning portion made of TPE while the connecting portion integrally formed with the attachment portion is embedded in the cushioning portion, when a compression force is applied to the cushioning portion, an elastic deformation of the cushioning portion in a compressing direction can be received by an end surface of the connecting portion. As a result, a stress can be concentrated to the cushioning portion along an outer circumference of the end surface of the connecting portion. Therefore, when the cushioning portion is repeatedly elastically deformed, a permanent distortion can be produced in the cushioning portion along the outer circumference of the end surface of the connecting portion. The permanent distortion produced in the cushioning portion may lead to reduced durability of the cushion clip. Further, the permanent distortion produced in the cushioning portion can form a folding line in an outer circumferential surface of the cushioning portion. This may lead to an inferior appearance of the cushion clip. Thus, there is a need in the art for an improved cushion clip.

BRIEF SUMMARY OF THE INVENTION

For example, in one aspect of the present invention, a cushion clip may include a cushioning portion made of a soft material and capable of being elastically deformed when a compression force is applied thereto, an attachment portion made of a hard material, and a connecting portion integrally formed with the attachment portion. The connecting portion is embedded in the cushioning portion such that the cushioning portion can be integrated with the attachment portion. The connecting portion is shaped such that an elastic deformation of the cushioning portion in a compressing direction can substantially be received by an end surface of the connecting portion when the compression force is applied to the cushioning portion. A portion of the cushioning portion surrounding an outer circumferential periphery of the end surface of the connecting portion has a lateral thickness that is varied in a direction in which the compression force is applied to the cushioning portion.

According to the aspect of the invention, when the compression force is applied to the cushioning portion, the compression force can be effectively dispersed. That is, a stress cannot be concentrated to the cushioning portion along the outer circumferential periphery of the end surface of the connecting portion. As a result, the whole cushioning portion can be uniformly compressed and elastically deformed. Thus, even when the cushioning portion is repeatedly deformed, the cushioning portion can be effectively prevented from producing a permanent distortion therein along the outer circumferential periphery of the end surface of the connecting portion. As a result, a folding line cannot substantially be formed in an outer circumferential surface of the cushioning portion. Therefore, the cushioning portion (the cushion clip) can have increased durability and a good appearance.

Optionally, the connecting portion has a tapered portion that is formed in the outer circumferential periphery of the end surface of the connecting portion, so that the lateral thickness of the portion of the cushioning portion can be varied.

Other objects, features and advantages of the present invention will be readily understood after reading the following detailed description together with the accompanying drawings and the claims.

DETAILED DESCRIPTION OF THE INVENTION

Next, representative embodiments of the present invention will be described with reference to the drawings.

First Detailed Representative Embodiment

A first detailed representative embodiment of the present invention will be described with reference to FIGS. 1 to 4.

Figure 1:
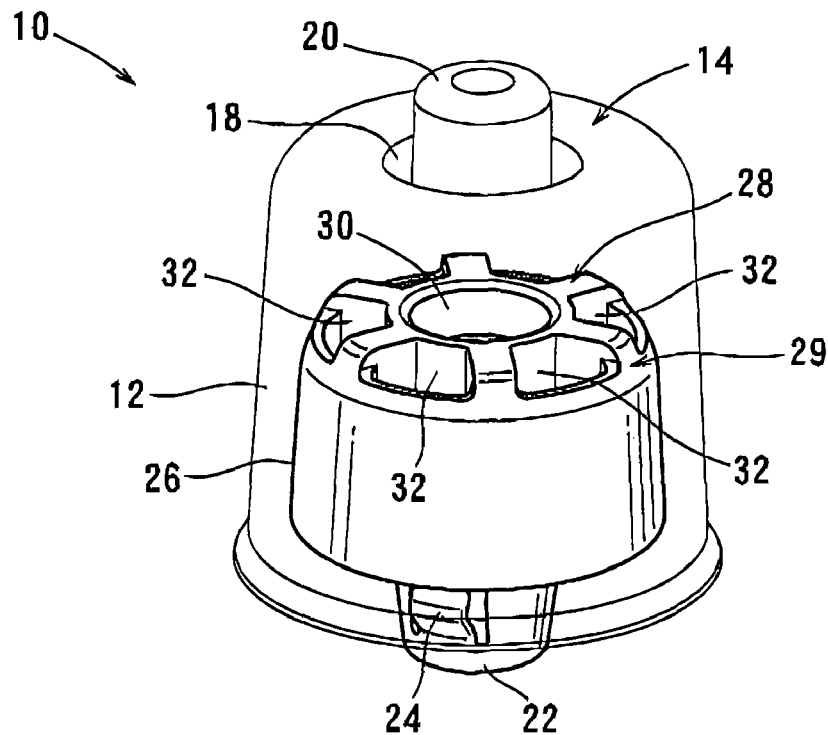
FIG. 1 is a perspective view of a cushion clip according to a first representative embodiment of the present invention, in which a connecting portion embedded in a cushioning portion is imaginarily shown.
Figure 2:
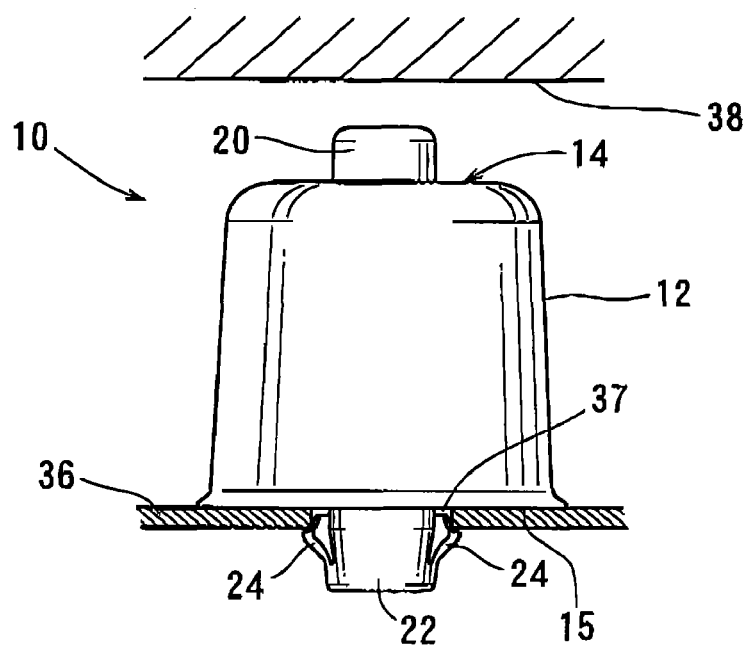
FIG. 2 is an elevational view of the cushion clip.

A representative cushion clip 10 is shown in FIGS. 1 to 4. The cushion clip 10 is intended to be attached to a vehicle body 36 (a fixed member) in order to receive a load of a vehicle slide door 38 (a movable member) and to absorb impact caused by the load thereof. As best shown in FIG. 1, a representative cushion clip 10 includes a cushioning portion 12 made of a soft material such as a thermoplastic elastomer (TPE), an attachment portion 22 made of a hard material such as polypropylene (PP), and a connecting portion 26 integrally formed with the attachment portion 22. The connecting portion 26 is embedded (received) in the cushioning portion 12, so that the cushioning portion 12 can be integrated with the attachment portion 22. As shown in FIG. 2, the attachment portion 22 is inserted into an attachment hole 37 formed in the vehicle body 36, so that the cushion clip 10 can be attached to the vehicle body 36.

Figure 3:
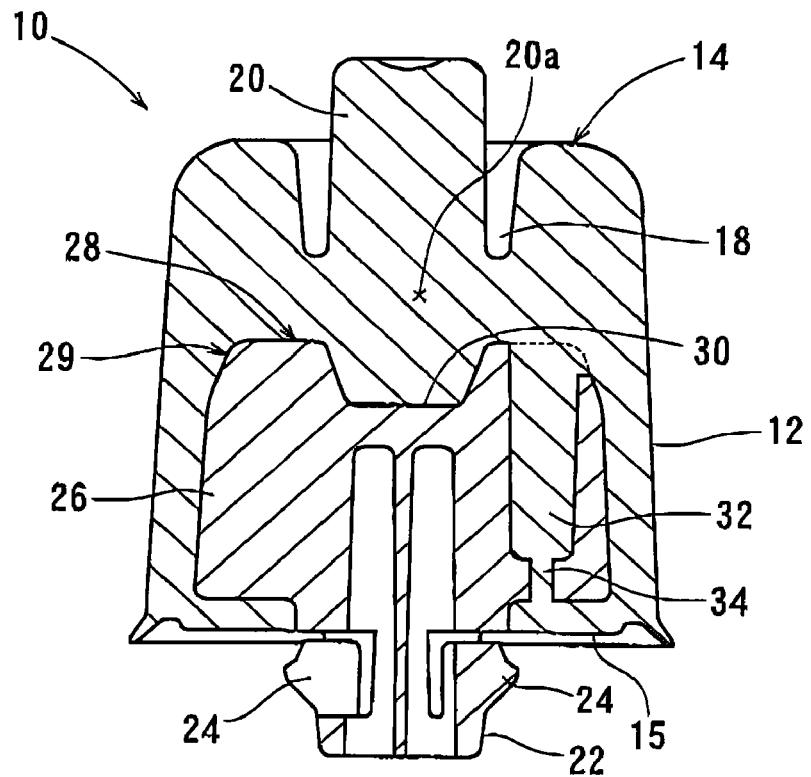
FIG. 3 is a longitudinal sectional view of the cushion clip.

As shown in FIGS. 1 to 3, the cushioning portion 12 generally has a truncated cone (frustoconical) shape and has an upper surface 14 having a reduced diameter. As shown in FIG. 2, when the slide door 38 is closed, the slide door 38 (the load of the slide door 38) can be received by the upper surface 14 of the cushioning portion 12, so that the load of the slide door 38 can be applied thereto. As a result, a compression force corresponding to the load can be applied to the cushioning portion 12, so that the cushioning portion 12 can be elastically deformed in a compressing direction. Thus, the impact caused by the load of the slide door 38 can be absorbed or dampened.

The cushioning portion 12 includes a cylindrical projected portion 20 that is integrally formed in a central portion of the upper surface 14. The projected portion 20 is projected upwardly from the upper surface 14. As shown in FIGS. 1 and 3, the cushioning portion 12 further includes an annular groove 18. The annular groove 18 is formed the upper surface 14 so as to surround the projected portion 20.

As will be recognized, the projected portion 20 can be elastically deformed independently of the cushioning portion 12 by a limited or small load (a small compression force). Further, when the slide door 38 is closed, the load of the slide door 38 can first contact the projected portion 20, so that the projected portion 20 can be elastically deformed before the cushioning portion 12 is elastically deformed. Therefore, the impact caused by the load of the slide door 38 can be smoothly absorbed or dampened.

As best shown in FIG. 2, the attachment portion 22 is projected downwardly from a central portion of a lower surface 15 of the cushioning portion 12. The attachment portion 22 is shaped to be inserted into the attachment hole 37 of the vehicle body 36. Further, the attachment portion 22 has a pair of engagement projections 24 that are diametrically formed in an outer surface thereof. The engagement projections 24 are respectively shaped to be flexed diametrically outwardly and inwardly due to elasticity of PP. Therefore, when the attachment portion 22 is pressed into the attachment hole 37, the attachment portion 22 can be inserted into the attachment hole 37 while the engagement projections 24 are flexed inwardly. Upon complete insertion of the attachment portion 22, the engagement projections 24 can engage an inner circumference of the attachment hole 37. Thus, the cushion clip 10 can be attached to the vehicle body 36.

As shown in FIGS. 1 and 3, the connecting portion 26 generally has a truncated cone (frustoconical) shape. The connecting portion 26 has a size smaller than the cushioning portion 12, so as to be received or embedded in the cushioning portion 12. The connecting portion 26 has an end (top) surface 28 having a reduced diameter. The connecting portion 26 includes a depressed (receiving) portion 30 that is formed in a substantially central portion of the end surface 28 thereof. The connecting portion 26 further includes a plurality of (six in this embodiment) open-ended vertical hollow portions 32 that are positioned along an outer circumferential surface thereof at desired intervals. Further, as shown in FIG. 3, each of the vertical hollow portions 32 has a narrow portion 34 formed in a lower end thereof.

The cushioning portion 12 and the attachment portion 22 (the connecting portion 26) can be integrally formed by two-color molding of the soft material (e.g., TPE) and the hard material (e.g., PP). In particular, the hard material is injected into a first molding die, so that the attachment portion 22 and the connecting portion 26 can be integrally molded or formed as a single piece. Thereafter, the soft material is injected into a second molding die while the connecting portion 26 of the attachment portion 22 is set in the second molding die, so that the cushioning portion 12 can be molded or formed while the connecting portion 26 is embedded in the cushioning portion 12. Thus, the cushion clip 10 can be formed. In the cushion clip 10 thus formed, the attachment portion 22 is integrally connected to the cushioning portion 12 while the connecting portion 26 is embedded in the cushioning portion 12.

As will be recognized, when the cushioning portion 12 can be molded, the injected soft material (TPE) can be filled in the vertical hollow portions 32 (the narrow portions 34) of the connecting portion 26 (FIG. 3). Therefore, the attachment portion 22 can be securely connected to the cushioning portion 12 via the connecting portion 26.

Figure 4:
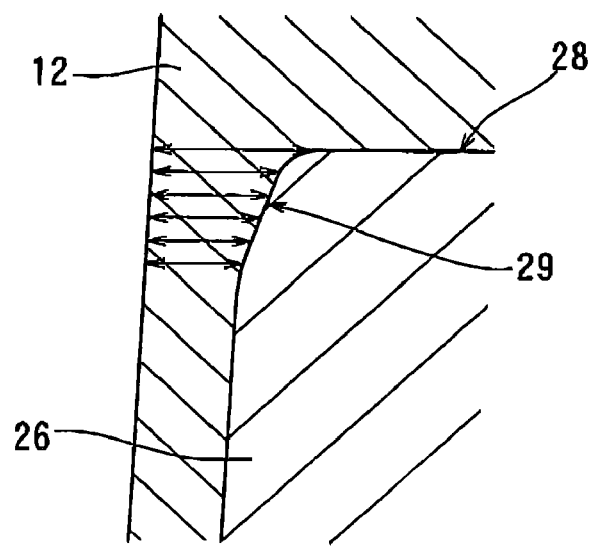
FIG. 4 is a partially enlarged view of FIG. 3.

Further, as shown in FIGS. 1, 3 and 4, the connecting portion 26 has a tapered portion 29 that is formed in an outer circumferential periphery of the end surface 28 of the connecting portion 26 (i.e., an upper end circumferential portion of the connecting portion 26). As a result, as best shown in FIG. 4, a portion of the cushioning portion 12 corresponding to the tapered portion 29 has a lateral thickness that is vertically gradually varied. In other words, a portion of the cushioning portion 12 surrounding the outer circumferential periphery of the end surface 28 of the connecting portion 26 has a lateral thickness that is varied in a direction in which the load of the slide door 38 can be applied to the cushioning portion 12 (FIG. 2). In particular, the portion of the cushioning portion 12 corresponding to the tapered portion 29 has an upper thickened portion and a lower thinned portion. That is, as shown by double-headed arrows of different length in FIG. 4, the lateral thickness of the portion of the cushioning portion 12 corresponding to the tapered portion 29 is reduced downwardly.

Further, as shown in FIG. 3, the depressed portion 30 formed in the end surface 28 of the connecting portion 26 is formed to be vertically (axially) oppositely positioned to and vertically aligned with the projected portion 20 of the cushioning portion 12. In addition, when the cushioning portion 12 is molded, the injected soft material (TPE) can be filled in the depressed portion 30. As a result, a base portion 20a of the projected portion 20 of the cushioning portion 12 can be vertically thickened. In other words, a central portion of the cushioning portion 12 can be vertically thickened.

Next, an operation of the cushion clip 10 thus constructed will now be described in detail.

First, as shown in FIG. 2, the attachment portion 22 is inserted into the attachment hole 37 of the vehicle body 36. Upon insertion of the attachment portion 22, the engagement projections 24 formed in the attachment portion 22 can engage the inner circumference of the attachment hole 37, so that the cushion clip 10 can be attached to the vehicle body 36.

When the slide door 38 is closed, the slide door 38 can be received by the cushion clip 10. At the time, the load of the slide door 38 can be first applied to the projected portion 20 of the cushioning portion 12. As a result, the projected portion 20 can be compressed and elastically deformed. Thereafter, the load of the slide door 38 can be applied to the upper surface 14 of the cushioning portion 12. As a result, the compression force corresponding to the load can be applied to the cushioning portion 12, so that the cushioning portion 12 can be compressed and elastically deformed in the compressing direction. Thus, the impact caused by the load of the slide door 38 can be absorbed or dampened.

Further, as described above, the base portion 20a of the projected portion 20 of the cushioning portion 12 can be vertically thickened. Therefore, when the load of the slide door 38 is applied to the projected portion 20, the projected portion 20 can substantially be axially linearly compressed and deformed without laterally inclined or buckled. As a result, the impact caused by the load of the slide door 38 can be reliably absorbed or dampened. Further, the projected portion 20 can reliably have elasticity over a long period of time. Conversely, when the load of the slide door 38 is released from the projected portion 20, the projected portion 20 can be reliably restored. Therefore, the cushion clip 10 can have an increased appearance.

Second Detailed Representative Embodiment

A second detailed representative embodiment will now described in detail with reference to FIGS. 5 to 7.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 5:
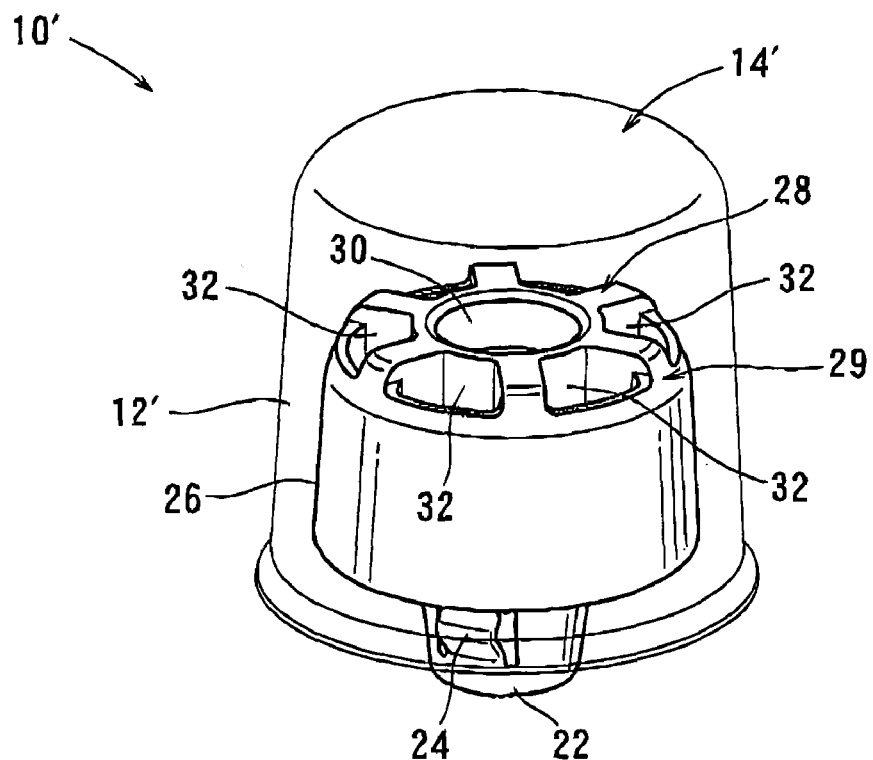
FIG. 5 is a perspective view of a cushion clip according to a second representative embodiment of the present invention, in which a connecting portion embedded in a cushioning portion is imaginarily shown.
Figure 6:
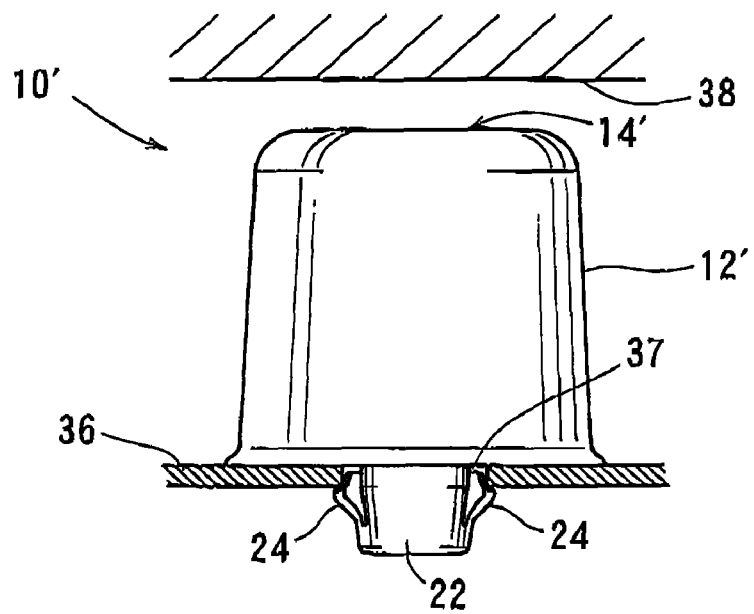
FIG. 6 is an elevational view of the cushion clip.
Figure 7:
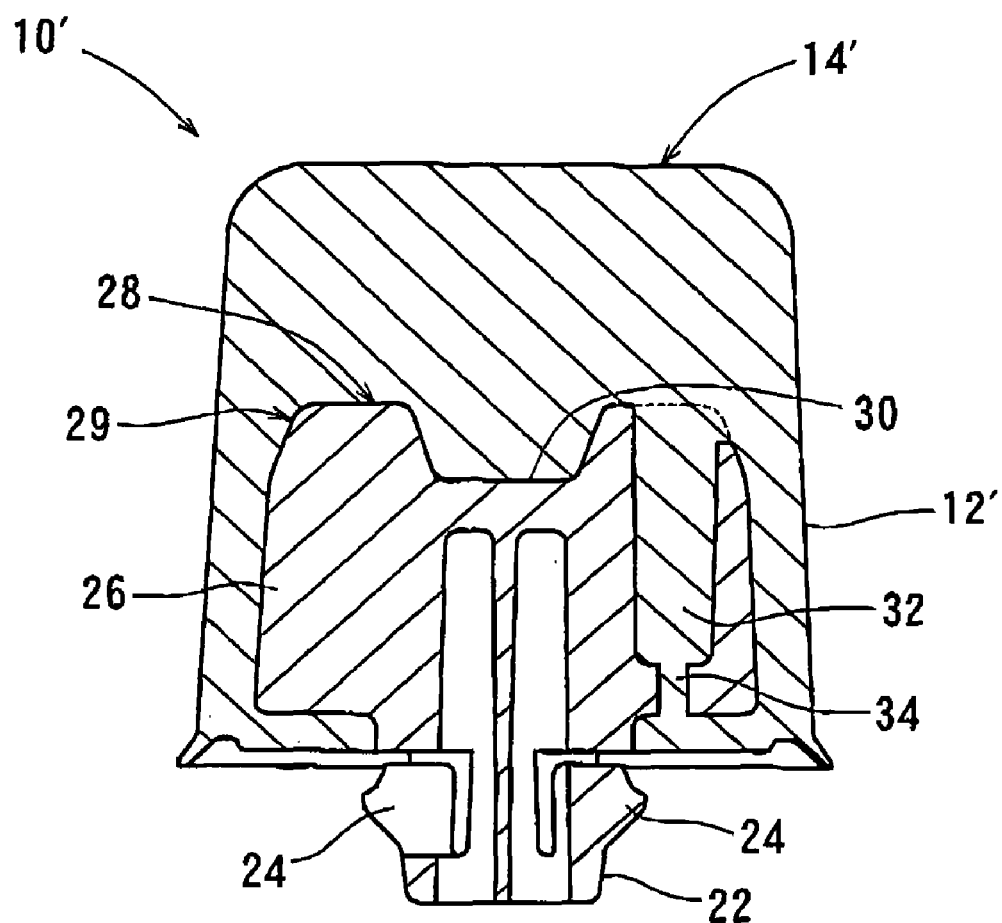
FIG. 7 is a longitudinal sectional view of the cushion clip.

As shown in FIGS. 5 to 7, in a cushion clip 10' of this embodiment, a cushioning portion 12' does not include an element corresponding to the cylindrical projected portion 20 of the first embodiment. Further, the cushioning portion 12' does not include an element corresponding to the annular groove 18 of the first embodiment. Therefore, unlike the upper surface 14 of the cushioning portion 12, an upper surface 14' of the cushioning portion 12' is generally flattened over the entire area thereof.

Similar to the first embodiment, the cushion clip 10' can be attached to the vehicle body 36 (FIG. 6). When the slide door 38 is closed, the slide door 38 can be received by the cushion clip 10'. However, in this embodiment, the load of the slide door 38 can be directly applied to the upper surface 14' of the cushioning portion 12'. As a result, the compression force corresponding to the load can be applied to the cushioning portion 12', so that the cushioning portion 12' can be compressed and elastically deformed in the compressing direction. Thus, the impact caused by the load of the slide door 38 can be absorbed or dampened.

In the first and second embodiments described above, when the compression force is applied to the cushioning portion 12 or 12', an elastic deformation of the cushioning portion 12 or 12' in the compressing direction can substantially be received by the end surface 28 of the connecting portion 26.

Figure 8:
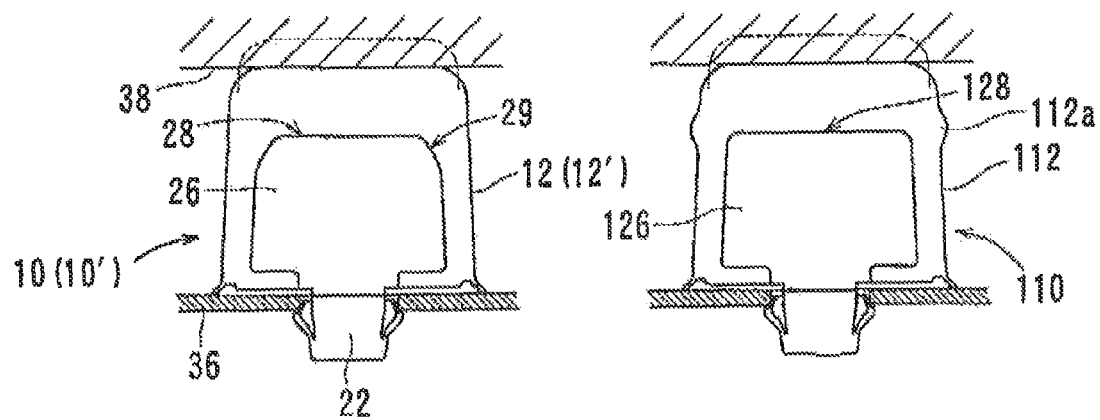
FIG. 8(A) is an explanatory view of the cushion clip, which view illustrates a condition in which the cushion clip is deformed or compressed.
FIG. 8(B) is an explanatory view of a conventional cushion clip, which view illustrates a condition in which the conventional cushion clip is deformed or compressed.

However, in the embodiments, the lateral thickness of the portion of the cushioning portion 12 or 12' surrounding the outer circumferential periphery of the end surface 28 of the connecting portion 26 (the upper end circumferential portion of the connecting portion 26) is varied in the direction in which the load of the slide door 38 can be applied to the cushioning portion 12. In particular, the portion of the cushioning portion 12 or 12' corresponding to the outer circumferential periphery of the end surface 28 of the connecting portion 26 is reduced downwardly in thickness because the tapered portion 29 is formed in the outer circumferential periphery of the end surface 28 of the connecting portion 26. Therefore, the compression force applied to the cushioning portion 12 or 12' can be effectively dispersed. That is, a stress cannot be concentrated to the cushioning portion 12 or 12' along the outer circumferential periphery of the end surface 28 of the connecting portion 26. As a result, as shown in FIG. 8(A), the whole cushioning portion 12 or 12' can be uniformly compressed and elastically deformed. Thus, even when the cushioning portion 12 or 12' is repeatedly elastically deformed, the cushioning portion 12 or 12' can be effectively prevented from producing a permanent distortion therein along the outer circumferential periphery of the end surface 28 of the connecting portion 26. As a result, a folding line cannot substantially be formed in an outer circumferential surface of the cushioning portion 12 or 12'. Therefore, the cushioning portion 12 or 12' (the cushion clip 10 or 10') can have increased durability and a good appearance.

To the contrary, as shown in FIG. 8(B), in a conventional cushion clip 110, a portion of a cushioning portion 112 corresponding to an outer circumferential periphery of an end surface 128 of the connecting portion 126 is not varied in thickness because the connecting portion 126 does not have a tapered portion. Therefore, a compression force applied to the cushioning portion 112 cannot be effectively dispersed. That is, a stress can be concentrated to the cushioning portion 112 along the outer circumferential periphery of the end surface 128 of the connecting portion 126. Therefore, when the compression force is applied to the cushioning portion 112, the cushioning portion 112 can be focally deformed along the outer circumferential periphery of the end surface 128 of the connecting portion 126, so as to form an annular bulged portion 112a. As a result, when the cushioning portion 112 is repeatedly elastically deformed, a permanent distortion can be produced in the cushioning portion 112 caused by the bulged portion 112a. The permanent distortion thus produced may lead to reduced durability of the cushioning portion 112 (the cushion clip 110). Further, the permanent distortion can form a folding line in an outer circumferential surface of the cushioning portion 112. Such a folding line may lead to an inferior appearance of the cushion clip 112.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A cushion clip, comprising:
   a cushioning portion made of a soft material and capable of being elastically deformed when a compression force is applied thereto,
   an attachment portion made of a hard material, and
   a connecting portion integrally formed with the attachment portion,
   wherein the connecting portion is embedded in the cushioning portion such that the cushioning portion is integrated with the attachment portion,
   wherein the connecting portion is shaped such that an elastic deformation of the cushioning portion in a compressing direction can substantially be received by an end surface of the connecting portion when the compression force is applied to the cushioning portion, and
   wherein the connecting portion defines an outer circumferential surface, the outer circumferential surface including a corner portion extending from the end surface, a first tapered portion extending from the corner portion, and a second portion extending from the first tapered portion, the first tapered portion having a taper angle different from a taper angle of the second portion, such that a portion of the cushioning portion surrounding the first tapered portion of the outer circumferential surface of the connecting portion has a lateral thickness that is varied in a direction in which the compression force is applied to the cushioning portion.

2. The cushion clip as defined in claim 1, wherein the connecting portion includes a depressed portion that is formed in a substantially central portion of the end surface thereof so that a central portion of the cushioning portion is vertically thickened.

3. The cushion clip as defined in claim 1, wherein the connecting portion includes a plurality of open-ended vertical hollow portions that are positioned along the outer circumferential surface thereof.

4. The cushion clip as defined in claim 1 wherein the cushioning portion includes a cylindrical projected portion that is integrally formed in a central portion of an upper surface thereof.

5. A cushion clip, comprising:
a cushioning portion made of a soft material and capable of being elastically deformed when a compression force is applied thereto,
an attachment portion made of a hard material, and
a connecting portion integrally formed with the attachment portion,
wherein the connecting portion is embedded in the cushioning portion such that the cushioning portion is integrated with the attachment portion,
wherein the connecting portion is shaped such that an elastic deformation of the cushioning portion in a compressing direction can substantially be received by an end surface of the connecting portion when the compression force is applied to the cushioning portion,
wherein a portion of the cushioning portion surrounding an outer circumferential surface of the end surface of the connecting portion has a lateral thickness that is varied in a direction in which the compression force is applied to the cushioning portion, and
wherein the connecting portion includes a depressed portion that is formed in a substantially central portion of the end surface thereof so that a central portion of the cushioning portion is vertically thickened.

6. A cushion clip, comprising:
a cushioning portion made of a soft material and capable of being elastically deformed when a compression force is applied thereto,
an attachment portion made of a hard material, and
a connecting portion integrally formed with the attachment portion,
wherein the connecting portion is embedded in the cushioning portion such that the cushioning portion is integrated with the attachment portion,
wherein the connecting portion is shaped such that an elastic deformation of the cushioning portion in a compressing direction can substantially be received by an end surface of the connecting portion when the compression force is applied to the cushioning portion,
wherein a portion of the cushioning portion surrounding an outer circumferential surface of the end surface of the connecting portion has a lateral thickness that is varied in a direction in which the compression force is applied to the cushioning portion, and
wherein the connecting portion includes a plurality of open-ended vertical hollow portions that are positioned along the outer circumferential surface thereof.

* * * * *